Figure 2:
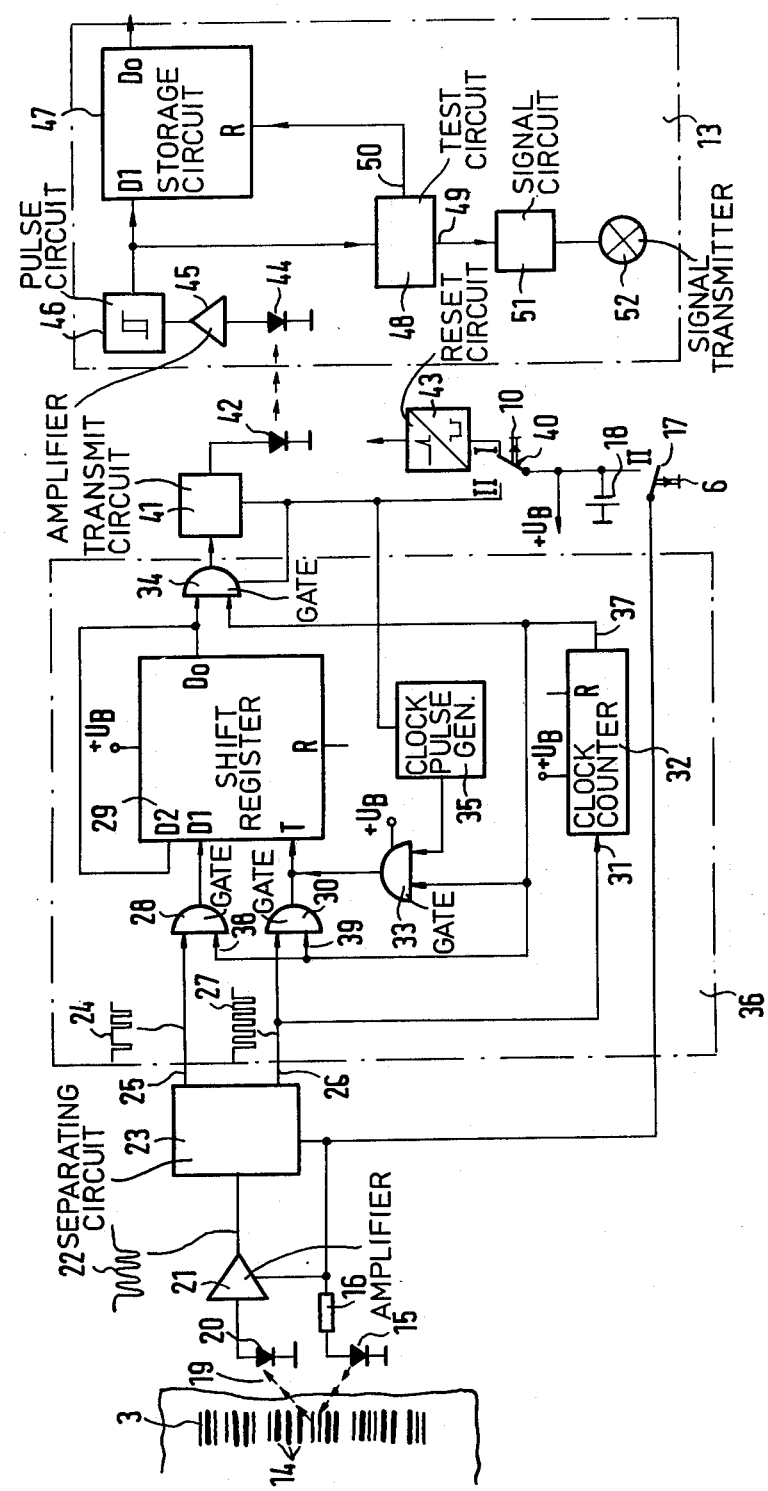

United States Patent [19]

Apitz et al.

[11] Patent Number: 4,465,926
[45] Date of Patent: Aug. 14, 1984

[54] OPTICAL READING DEVICE FOR THE MANUAL OPTICAL SCANNING AND FOR EVALUATING OPTICALLY READABLE CHARACTER CODES

[75] Inventors: Siegfried Apitz, Pforzheim; Rolf Nonnenmann, Karlsbad, both of Fed. Rep. of Germany

[73] Assignee: International Standard Electric Corporation, New York, N.Y.

[21] Appl. No.: 355,016

[22] Filed: Mar. 5, 1982

[30] Foreign Application Priority Data

Mar. 11, 1981 [DE] Fed. Rep. of Germany ....... 3109286

[51] Int. Cl.³ .............................................. G06K 7/10
[52] U.S. Cl. ................................ 235/472; 235/419; 235/454; 250/555
[58] Field of Search ............... 235/472, 487, 419, 435, 235/451, 381; 250/555

[56] References Cited

U.S. PATENT DOCUMENTS

| | | | |
|---|---|---|---|
| 3,826,900 | 7/1974 | Moellering | 235/472 |
| 4,120,452 | 10/1978 | Kimura et al. | 235/381 |
| 4,179,064 | 12/1979 | Yoshioka et al. | 235/381 |
| 4,224,666 | 9/1980 | Girand | 235/487 |
| 4,297,569 | 10/1981 | Flies | 238/443 |
| 4,418,277 | 11/1983 | Tremmel et al. | 235/472 |

FOREIGN PATENT DOCUMENTS 52-63623 5/1977 Japan .................................. 235/472

Primary Examiner—A. D. Pellinen
Assistant Examiner—Robert Lev
Attorney, Agent, or Firm—James B. Raden; William J. Michals

[57] ABSTRACT

A hand-held bar-code reader (bar-code wand) which forms part of an optical reading device and is capable of being led by hand over the bar code, comprises a storage circuit for storing the data pulse train corresponding to the scanning signals, and a photo- or sound-transmitter by which the stored data pulse train is transmitted to a separate equipment, such as a video tape recorder or radio receiver provided with a photo- or sound-receiver and an evaluating circuit. In another example of embodiment, the equipment comprising the evaluating circuit, contains a reader compartment provided with a connector member for connection to the reader which, following the scanning and storing of one or more words of the character code, is returned to its compartment and is automatically read out via the connector contacts.

9 Claims, 6 Drawing Figures

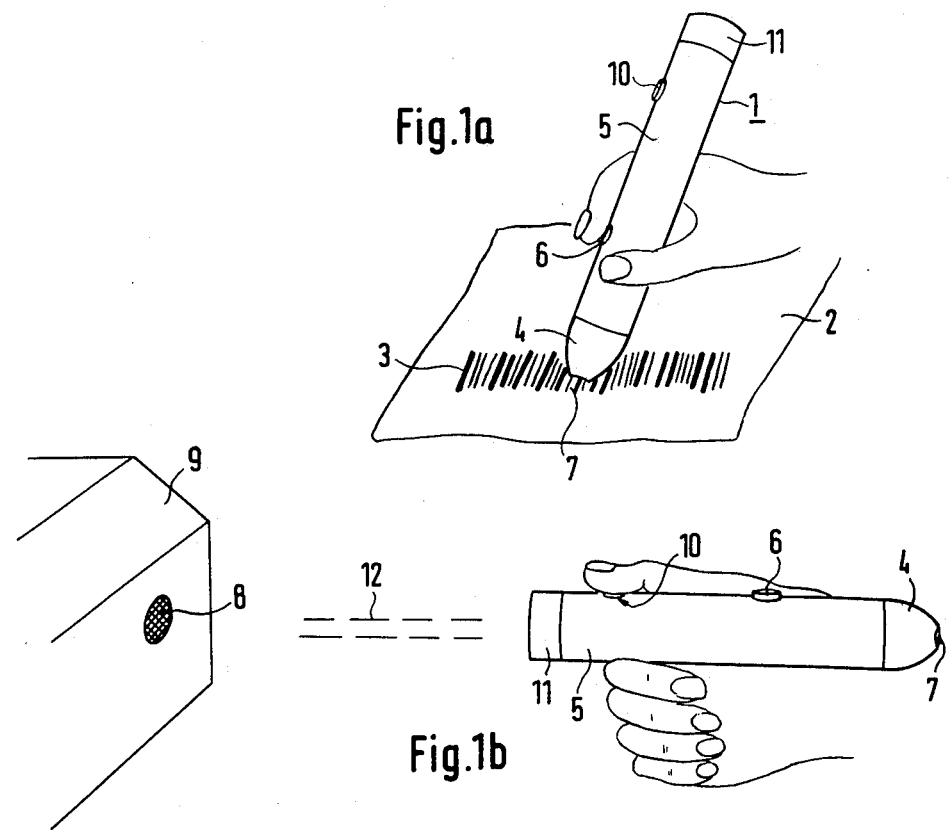
Fig.1a
Fig.1b
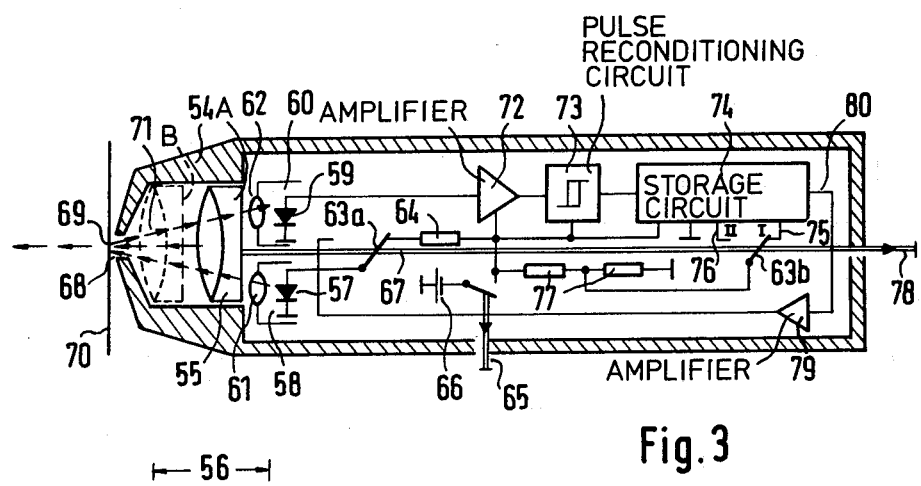
Fig.3

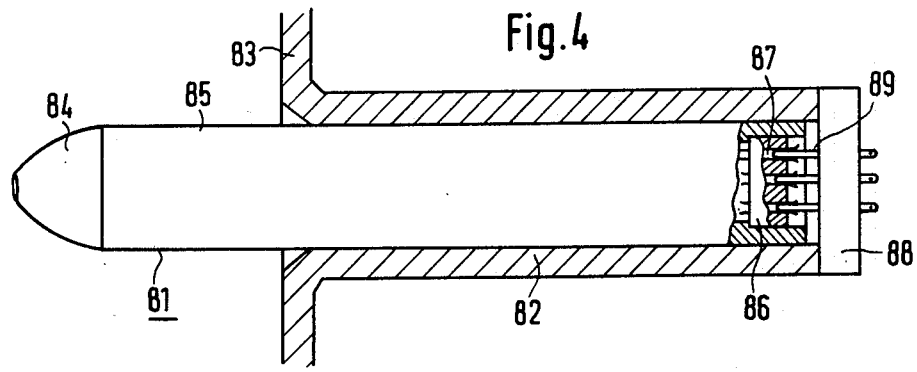
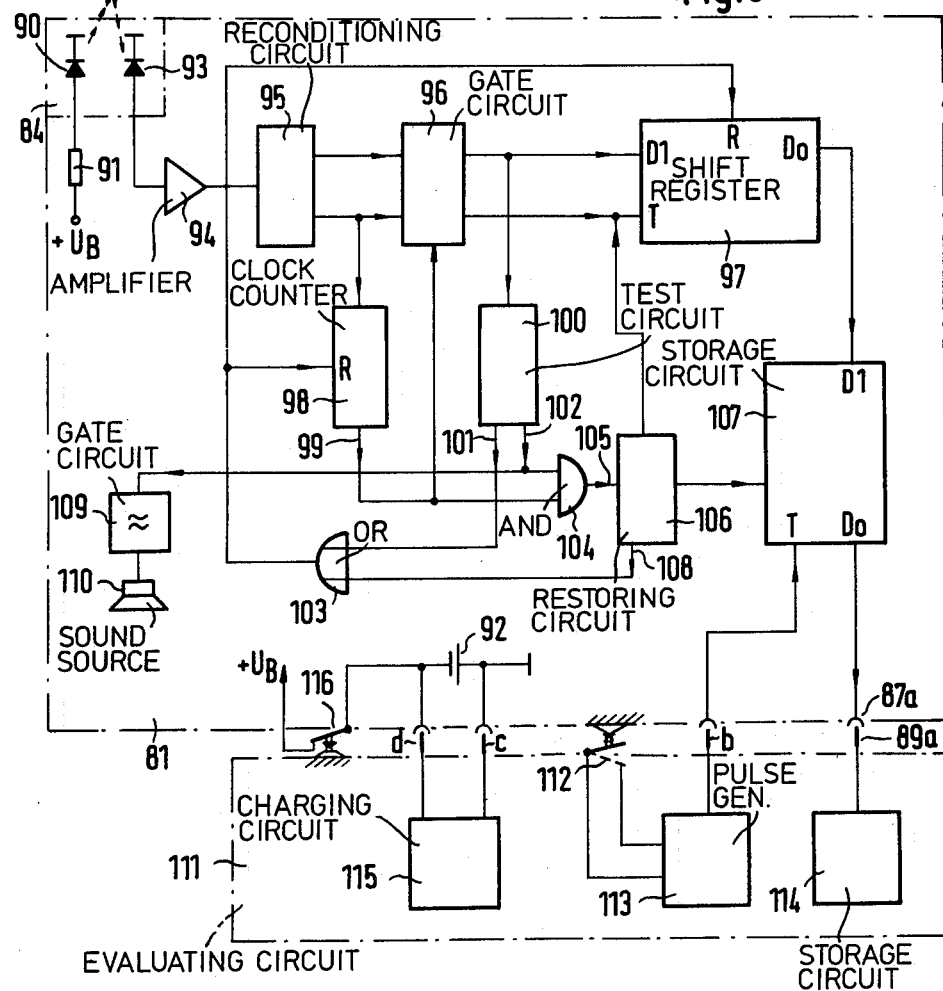

OPTICAL READING DEVICE FOR THE MANUAL OPTICAL SCANNING AND FOR EVALUATING OPTICALLY READABLE CHARACTER CODES

The invention relates to an optical reading device capable of reading optical bar code and of controlling the operation of equipment in dependence on the information contents of the bar code.

Such types of optical reading devices consist of a reader which is an independent, hand-held appliance which, when of this type is capable of being led by hand over an optically readable character code deposited on a recording medium, and which is often rod-, wand- or pen-shaped, and of an evaluating device which mostly, as an input device, forms part of an equipment processing the read information, such as a recording instrument or a computer.

From the data sheet 5953-0409 (10/79) of Hewlett-Packard there is known a rod-shaped code scanner referred to as the HEDS-3000 bar-code wand for the optical reading of bar codes, which is provided at its one end with a scanning head having a light-exiting aperture for optically scanning a bar code and a pushbutton switch on its rod-shaped housing, and is provided at its other end with a connecting cord or cable. The free end of the cord or cable of the conventional bar-code wand is provided with a socket connector member with which it is plugged into the plug connector member of an evaluating arrangement in an equipment separated from the bar-code wand, and is thus firmly connected to this equipment. This connecting cable, however, only permits a small distance between the code reader and the evaluating device in which control and indicating signals are formed out of the data signals as transferred by the reader, for the equipment of which the evaluating device forms a part. Moreover, the connecting cable restricts the handiness of the reader and the possibility of moving around the equipment to which it is connected.

It is the object of the invention, therefore, to design an optical reading device of the type mentioned hereinbefore, in such a way that the data as scanned by the reader can be transmitted, without a connecting cable, to the evaluating arrangement separated from the reader.

According to the invention, this object is achieved in an advantageous manner by providing the reader with a memory which stores the data contained in the bar code and by subsequently supplying the stored data to the evaluating arrangement using appropriately modulated radiation.

According to the invention, the cable connection is replaced in an advantageous manner by a light or sound radiation which merely requires the reader, subsequently to the scanning of a character code section, to be directed on to the receiver in the evaluating arrangement, and to be switched over to the transmitting operation. This is above all of advantage in the domestic field when the printed program data scanned with the aid of the reader and taken from a radio or TV programme guide, is to be stored into the programme storage of a consumer electronics equipment, or when data recorded in an optically readable character code, particularly in a bar code, are to be fed into a home computer, and in cases where a connecting cable or flexible cord is always in the way and likely to cause accidents.

The problem underlying the invention is further solved by providing the reader with a memory for the data contained in the bar code, and by subsequently transferring the stored data into the evaluating arrangement via electrical connections after the reader has been attached to the evaluating arrangement. This solution according to the invention offers the advantage that the required information can be scanned completely free from and independently of the evaluating arrangement, and that for the transmission of the scanned data to the evaluating arrangement there is required neither a cable nor a radiation field. Transmission is effected inside the code-reader compartment of the equipment containing the evaluating arrangement, without any action on the part of the user. At the same time, this code-reader compartment is also suitable for the safekeeping of the reader which is to be regarded as a further advantage.

In the following, the invention will now be explained in greater detail with reference to some preferred examples of embodiment shown in FIGS. 1 to 5 of the accompanying drawings, in which:

FIG. 1a shows a cordless wand shaped reader during the scanning of a bar code,

FIG. 1b shows the bar-code reader of FIG. 1a during its transmitting operation, pointed at the receiver of an equipment, as well as the evaluating arrangement forming part of the reader, FIG. 2 shows an electrical block diagram in a schematic representation of the reader and its evaluating arrangement by way of one example of embodiment of an optical reading device, FIG. 3 is the schematical representation of a further example of embodiment of a reader whose optical-system part can be switched to the scanning and the transmitting operation, and the schematic circuit representation, FIG. 4 is the schematical representation of a wand-shaped reader as placed into the compartment of an equipment containing the evaluating arrangement, and FIG. 5 shows an electrical block diagram in a schematical representation of the reader and the evaluating arrangement of a further example of embodiment of an optical reading device in which the reader is capable of being placed into a compartment of the equipment containing the evaluating arrangement.

FIG. 1a shows a reader 1 forming part of an optical reading device, which is led by hand in such a way over a character code 3 deposited on a recording medium 2, that the scanning head 4 arranged at one end of the rod-shaped housing 5 of the reader, is applied to the recording medium and sweeps over the character code. By depressing the pushbutton 6, the reader is switched to perform the scanning operation. A photoreceiver in the scanning head 4, through a light-exiting aperture 7 provided for in the scanning head 4, scans the different light reflections caused by the characters of the character code, i.e. scans reflections of the light which is transmitted through the light-exiting aperture and on to the character code by a phototransmitter likewise arranged inside the scanning head 4. The character code as shown in FIG. 1a is a bar code consisting of bars and spaces of different widths.

The data scanned from the character code are stored in the reader 1 and, thereafter, transmitted to an evaluating circuit via light or sound waves. For this purpose, is shown in FIG. 1b, the reader as shown in FIG. 1a, is pointed with its end opposite the scanning head, at a photo- or sound-receiver 8 of an evaluating circuit associated with the reader 1, which is arranged in an equipment 9 separated from the reader, e.g., in a video tape recorder, and a pushbutton 10 is depressed In this way the data as stored in the reader, and by means of a photo- or sound transmitter 11 arranged at one end of the reader, are transmitted via light- or sound-waves 12, in particular via infrared light or ultrasonic waves, to the photo- or sound-receiver 8 forming part of the equipment 9.

An optical reading device in which the scanned data as stored in the reader 1 are transmitted to an evaluating circuit 13 by means of infrared light waves, is shown in detail in the block diagram of FIG. 2. As the phototransmitter for scanning the bar pattern 14 of a bar code 3 there is used a light-emitting diode (LED) 15 which, across a resistor 16 and via a switch 17, is connected to the battery 18 of the reader. The emitted light 19 is reflected by the bar code, and through the here not particularly shown light exiting aperture of the scanning head of the reader, impinges upon a photodiode 20 serving as a photo-receiver, which converts the light fluctuations into an electric signal. This electric signal appears at the output of an amplifier 21 arranged subsequently to the photodiode, as an amplified electric scanning signal 22.

The bar code 3 schematically shown in FIG. 2, has a predetermined raster which is determinative of the different widths of both the bars and the spaces of the bar code, and from which a clock pattern of the bar code may be derived. Each sentence of the bar code which is to be scanned in the course of one scanning operation, contains the same number of raster clocks and a checkable arrangement of the bars.

In a pulse shaping and separating circuit 23 which is arranged subsequently to the amplifier 21, there is formed from the scanning signal 22 a pulse train 24 corresponding to the bar pattern of the bar code and which appears at the data output 25 of the circuit 23. At the same time, the circuit 23, at one clock output 26, forms from the scanning signal 22 a pulse train 27 of raster clocks. The data pulse train 24 is applied via a gate circuit 28 to a first data input D1 of a shift register 29, and the clock pulse train 27 is applied via a further gate circuit 30 to the clock input T of the shift register, and to a counting input 31 of a clock counter 32. The shift register 29, the clock counter 32, the gate circuits 28 and 30 together with further gate circuits 33 and 34 and a clock pulse generator 35 form part of a storage circuit 36 of the reader, wherein the shift register 29 is the storage device for the data pulse train 24. Following the number of raster clocks predetermined for the scanned word, the clock counter produces at its output 37 a signal by which the gate circuits 28 and 30 are are switched to the non-conducting state at their inhibiting inputs 38 and 39 and by which the gate circuits 33 and 34 are switched to the conducting state. During the scanning operation it is necessary for the switch 17 to be retained in the switched-on position II by means of the pushbutton key 6.

For transmitting the data pulse train as stored into the shift register 29, to the evaluating circuit 13, a switch 40 is brought by means of the pushbutton key 10 into the switch position II in which it switches the clock generator 35, the gate circuit 34 and a transmitter circuit 41 with a light-emitting diode 42 to the battery 18. The clock pulse generator 35 thus produces clock pulses which, via the gate circuit 33, are applied to the clock input T of the shift register and serially feed the stored data pulse train at the data output Do out of the shift register and into both the transmitting circuit 41 and a second data input D2 of the shift register. By repeatedly feeding the data pulse train into the shift register, the data pulse train 24 can be radiated repeatedly by the phototransmitter 42 until the reception thereof is acknowledged, for example, by the evaluating circuit 13.

Upon resetting the switch 40 to its first switch position I, a resetting signal is produced in a reset circuit 43 by which the contents of both the shift register 29 and the clock counter 32 are erased. In the normal position I of the two switches 17 and 40 only the storage circuit 36 remains connected to the battery 18 which brings about low current consumption.

The data pulse trains radiated by the LED 42 of the phototransmitter 41/42 of the reader 1 to the evaluating circuit 13 are received by a photodiode 44 of the evaluating circuit 13, amplified in a subsequently arranged amplifier 45, reconditioned in a pulse circuit 46 and stored into a storage circuit 47 of the evaluating circuit for being evaluated. Moreover, the received and reconditioned pulse train is fed to a test circuit 48 which, in response to a faultless data pulse train, produces at its release output 49 a release signal and, in the event of a faulty pulse train, produces a fault signal at its fault output 50. The fault signal is applied to the reset input R of the storage circuit of the evaluating circuit and erases the last either partly or completely stored data pulse train. The release signal, however, in a signal circuit 51 connected to the release output of the test circuit, triggers an acknowledging signal which, by an acknowledging signal transmitter 52, is radiated either as a visual-light or as an audible sound-signal.

Unlike the reader 1 as shown in FIGS. 1a, 1b and 2, the reader 53 as schematically shown by way of example in FIG. 3 has no light or sound transmitter of its own for transmitting the stored data pulse train, but comprises a part 55 of the lens system 56 of the reader arranged displaceably inside the scanning head 54. Moreover, inside the scanning head of the reader 53 there is arranged the phototransmitter 58 containing a light-emitting diode 57, and the photoreceiver 60 containing a photodiode 59, each with a fixed lens 61 and 62. The light-emitting diode 57, in a first switch position I of a switch 63a, is connected across a resistor 67 and via an operating switch 65 to a battery 66 supplying the circuit of the reader with the necessary operating voltage. The displaceable lens system part 55 is connected via a mechanical operative connection 67 to the switch 63a, 63b and, in the switch position I thereof, is in a retracted position A in which the lens system 56 images outside the scanning head 54 and directly in front of the light-exiting aperture 68 thereof, a light spot 69, from which the character code to be scanned, as deposited on a recording medium 70 in front of the light-exiting aperture, reflects the light 71 to the photodiode 59 of the phototransmitter 60. The scanning signal as produced by the photodiode is amplified in an amplifier 72 and is reconditioned in a pulse reconditioning circuit 73 for being stored into the subsequently arranged storage circuit 74. In the given example of embodiment, the storage circuit contains two control inputs 75 and 76 to which the switch 63bis connected. In the first position I of the switch 63b a signal from a signal source formed by a voltage divider 77 is applied to the input 75, with this signal switching the storage circuit 74 to storage operation.

For radiating the data pulse train as scanned and stored into the storage circuit of the reader 53, the switch 63a, 63b is switched to the second switch position II, and the displaceable part 55 of the lens system 56 is brought into the forward position B, by which the control signal, via the switch 63b, is applied to the control input 76 of the storage circuit 74, thus causing the storage circuit to operate in the readout mode. The stored data pulse train is read out at the data output 79 of the storage circuit serially and, via a driver circuit 80 and the switch 63a, to the LED 57. This LED 57, in this particular switch position II, radiates the read out data pulse train through the light-exiting aperture 68 to the evaluating circuit which is not particularly shown. When set to position B, the lens system produces a cone of light which is favourable for the radiation purpose.

FIG. 4 shows a rod-shaped code-bar reader 81 positioned in its sleeve-shaped compartment 82 provided for in the housing 83 of an equipment, such as a video tape recorder or radio receiver containing the evaluating circuit necessary for the reader. The end of the rod-shaped housing 85 of the reader, lying opposite the scanning head 84 is provided with a plug contact device 86 with socket contacts 87 serving as the connector for the circuit of the reader. On the bottom of the receiving compartment 82 there is likewise provided a plug contact device 88 with plug contacts 89 serving as the mating contacts of the connector. When in the state of being inserted in the receiving compartment, the plug contacts 89 of the evaluating circuit engage into the associated socket contacts 87 of the reader thus connecting the circuit of the reader to the evaluating circuit.

One example of embodiment of the circuits of an optical reading device schematically shown in FIG. 4, is schematically shown as a block diagram in FIG. 5. The reader 81 contains in its scanning head 84 a light-emitting diode 90 serving as the phototransmitter which, across a resistor 91, is connected to the supply voltage $U_B$ of a battery 22 of the reader, and also contains a photodiode 93 for serving as the photoreceiver. The scanning signal as produced upon scanning a character code, at the output of the photodiode 93, is amplified in a subsequently arranged amplifier 94, and in a pulse reconditioning circuit 95, there is formed therefrom a data pulse train 24 and a clock pulse train 27, i.e., of the raster clocks of the scanning signal. Both pulse trains are applied via a gate circuit 96 to the data input D1 or to the clock input T of a shift register 97 serving as the first storage circuit into which the scanned pulse train 24 is stored. At the same time, the pulses of the clock pulse train are counted into a clock counter 98 which, at its output 99, produces an output signal as soon as a predetermined number of clock pulses has been counted into the clock counter, with this signal serving to switch the gate circuit 96 into the nonconducting state. The data pulse train 24 moreover, behind the gate circuit 96, is applied to the input of a test circuit 100 which, in the event of a faulty data pulse train, produces a fault signal at a fault output 101 and, in the event of a faultless data input train, produces a release signal at a release output 102. The fault output 101 is connected via a decoupling OR circuit 103 to the reset inputs R of the clock counter and of the shift register and, in the event of a faulty data pulse train, erases the contents of the shift register 97 and of the clock counter 98, so that the just scanned word of the character code must be scanned again and stored into the shift register 97.

In the event of a data pulse train 24 found to be faultless, and subsequently to the storing of the data pulse train into the shift register 97, both the output signal of the clock counter 99 and the release signal of the test circuit 100, via an AND circuit, act upon the control input 105 of a restoring circuit 106 thus tripping a restoring process by which the data pulse train as stored in the shift register 97 is restored into a second storage circuit 107. At the end of the restoring process, the restoring circuit, at one reset output 108, produces a reset signal by which the shift register 97 and the clock counter 99 are reset to normal. In addition thereto, the release signal produces in a gate circuit 109 connected to the release output 102 of the test circuit, an acknowledgment signal radiated by the sound source 110. Thereafter, a new word in character code can be scanned by the reader on the recording medium.

The second storage circuit 107 has a capacity suitable for storing several data pulse trains 24, so that several words can be scanned successively. The words or sentences in character code capable of being read in the course of one scan cycle each have the same predetermined number of raster elements.

For effecting the readout of the information stored in the second storage circuit, the reader is inserted into its compartment in an equipment containing the associated evaluating circuit, so that the electric connecting contacts 87a through 87d of the circuit of the reader 81 come into electrical contact with the associated opposite contacts 89a through 89d of the evaluating circuit 111. For example, when inserted in its compartment, the reader, via a switch 112 actuated by it, switches on a clock pulse generator 113 of the evaluating circuit, and the clock pulses thereof serially read out the contents of the second storage circuit 107 of the reader, and transfer the read out information into a storage circuit 114 of the evaluating circuit for further processing.

In a preferred embodiment of the reader 81 as shown in FIG. 5, the battery 22 is of the rechargeable type which, when the reader is inserted in its compartment 82, is connected to a charging circuit 115 of the evaluating circuit via the contacts 87c, 87d and 89c, 89d, for being recharged in this way and maintaining its charge when the reader is replaced into its compartment. At the same time, by means of a switch 116 of the reader actuated inside the receiving compartment, the diodes 90 and 93 can be switched away from the battery when in this particular state.

We claim:

1. Optical reading device for manually scanning and for evaluating optically readable character codes, in particular a bar code, with the aid of a handheld code reader which, inside a scanning head and behind a light-exiting aperture, contains a lens system, a photo-transmitter and a photo-receiver for the scanning operation, which converts the light as entering through the light-exiting aperture, into electric scanning signals, and comprising an evaluating circuit which is in connection with the code reader, and which forms control and indicating signals from the signals as received by the code reader, comprising, in the code reader, means for storing the data received from said photo-receiver; means for serially retrieving the stored data from said storing means; means for establishing remote communication over a substantial distance between the code reader and the evaluating circuit via radiation propagating through the ambient atmosphere, and switching means selectively operative for establishing connections between the photo-receiver and the storing means during a scanning operation, and between the storing and retrieving means and said establishing means during a transmitting operation; and, in the evaluating circuit, means for receiving the radiation remotely transmitted by said establishing means.

2. An optical reading device as claimed in claim 1, wherein said photo-transmitter inside said scanning head of said reader, in a first position of said switching means acts as the photo-transmitter for effecting the scanning of the bar code, and is connected to a source of supply voltage of said reader and, in a second position of said switching means, constitutes a photo-transmitter part of said establishing means for effecting the transmission of the data to said receiving means of said evaluating circuit; and wherein said receiving means is sensitive to the radiation transmitted by said photo-transmitter.

3. An optical reading device as claimed in claim 2, wherein at least one part of the lens system inside said scanning head of said reader is displaceable, and further comprising means for so connecting said switching means with said displaceable part of said lens system, that in a first position of said switching means the displaceable part is set to a near position for the scanning operation of said reader and, in the second position of said switching means, the displaceable part is set to a more distant position for the transmission operation of said reader.

4. An optical reading device as claimed in claim 1, wherein said reader is rod-shaped having one end on which the scanning head is mounted, and wherein said establishing means includes a radiation transmitter separate from said photo-transmitter and mounted on the other end of said rod-shaped reader.

5. An optical reading device as claimed in claim 1 wherein said storing means of said reader contains a clock counter for counting the clocks of a clock pulse train of the scanned bar code and, upon reaching a predetermined number of raster clocks, produces an output signal at its output, that the output of said clock counter is connected to inhibiting inputs of gate circuits of said storage circuit which, in response to an output signal of said clock counter, switch the data input of said storing means to the non-conductive state and release a control input for the switchover of said storing means to readout operation.

6. An optical reading device as claimed in claim 1, wherein said storing means in said reader contains a shift register for serving as a storage for said data, as well as a clock pulse generator, and that the data output of said shift register is connected to a second data input of said shift register, and that the clock pulse input of said shift register, in the second position of said switching means, is connected to the output of said clock pulse generator.

7. An optical reading device as claimed in claim 1, wherein said establishing means includes an infrared photo-transmitter, and said receiving means in said evaluating circuit includes an infrared photo-receiver.

8. An optical reading device as claimed in claim 1, wherein said establishing means includes an ultrasonic transmitter, and said receiving means in said evaluating circuit includes an ultrasonic receiver.

9. An optical reading device as claimed in claim 1, wherein said evaluating circuit contains a testing circuit which, in response to a faulty data pulse train of a word or sentence with a checkable data pulse train as transmitted to said evaluating circuit, produces at its output a fault signal which erases the faulty data pulse train stored in said evaluating circuit and which, in response to a faultless data pulse train produces at its release output a release signal, and that to said release output of said testing circuit there is connected a signal circuit with a signal source for producing an acknowledgement signal in response to a release signal.

* * * * *